(12) United States Patent
Zimmermann

(10) Patent No.: US 8,076,886 B2
(45) Date of Patent: Dec. 13, 2011

(54) DEVICE AND A METHOD FOR PROVIDING ELECTRICAL ENERGY TO AN ACTUATOR, AND AN ACTUATOR SYSTEM

(75) Inventor: Rudolf Zimmermann, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 454 days.

(21) Appl. No.: 12/309,605

(22) PCT Filed: Jul. 25, 2006

(86) PCT No.: PCT/EP2006/007320
§ 371 (c)(1),
(2), (4) Date: Jan. 23, 2009

(87) PCT Pub. No.: WO2008/011894
PCT Pub. Date: Jan. 31, 2008

(65) Prior Publication Data
US 2009/0322271 A1    Dec. 31, 2009

(51) Int. Cl.
*H02P 1/00*   (2006.01)

(52) U.S. Cl. ........ 318/440; 318/530; 318/532; 318/656; 318/813

(58) Field of Classification Search .................. 318/440, 318/523, 530, 532, 656, 812, 813; 307/109, 307/110
See application file for complete search history.

(56) References Cited

U.S. PATENT DOCUMENTS

| | | | | |
|---|---|---|---|---|
| 3,845,374 A * | 10/1974 | Clarady et al. | ................ | 318/445 |
| 4,733,102 A * | 3/1988 | Nakayama et al. | ........... | 307/107 |
| 5,153,448 A | 10/1992 | Zierhut | | |
| 5,160,875 A * | 11/1992 | Kono | ............................ | 318/280 |
| 5,659,233 A * | 8/1997 | Nashiki | ........................ | 318/440 |
| 6,163,578 A | 12/2000 | Elbracht | | |
| 6,771,518 B2 * | 8/2004 | Orr et al. | ........................ | 363/16 |

FOREIGN PATENT DOCUMENTS

| | | |
|---|---|---|
| DE | 19947501 A1 | 5/2001 |
| GB | 2123589 A | 2/1984 |

* cited by examiner

*Primary Examiner* — Walter Benson
*Assistant Examiner* — Thai Dinh
(74) *Attorney, Agent, or Firm* — Harness, Dickey & Pierce, P.L.C.

(57) ABSTRACT

A method for providing electrical energy to an actuator is disclosed. In at least one embodiment, the method includes having a first voltage (UBUS) from a data bus; ii) converting the electric current to a current having a second voltage that is higher than the first voltage; iii) storing electrical energy of the second electric current; and discharging the stored electrical energy to an actuator. A device is also disclosed for providing electrical energy to an actuator.

18 Claims, 1 Drawing Sheet

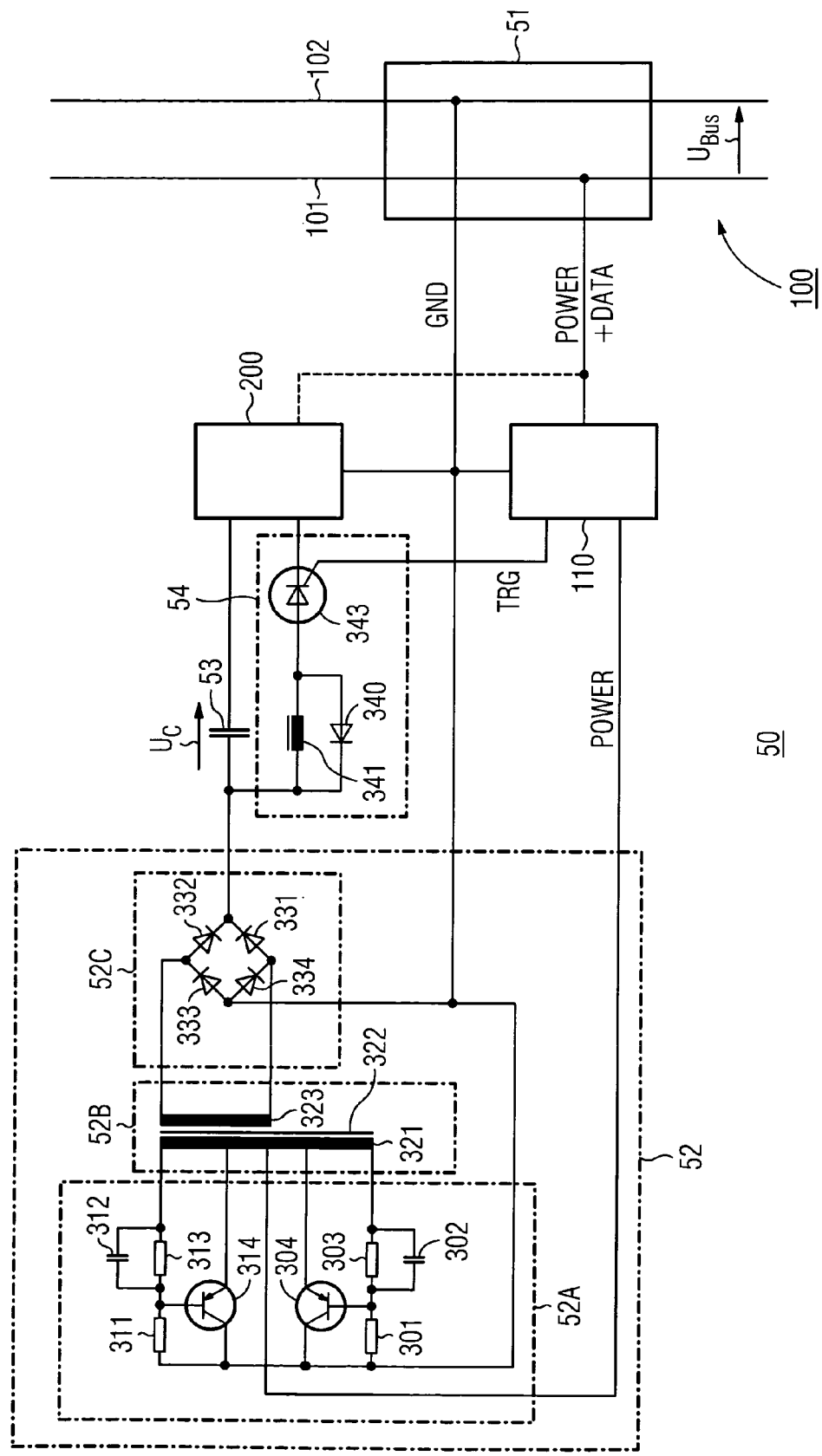

DEVICE AND A METHOD FOR PROVIDING ELECTRICAL ENERGY TO AN ACTUATOR, AND AN ACTUATOR SYSTEM

PRIORITY STATEMENT

This application is the national phase under 35 U.S.C. §371 of PCT International Application No. PCT/EP2006/007320 which has an International filing date of Jul. 25, 2006, the entire contents of which are hereby incorporated herein by reference.

FIELD OF THE INVENTION

Embodiments of the invention generally relate to devices and methods for providing electrical energy to an actuator, and/or to actuator systems.

BACKGROUND ART

In different applications for automation engineering, the use of sensors or actuators via data buses for monitoring and controlling of processes has become very popular. Related cost advantages may be remarkable, in particular, because the complexity of the wiring and cabling may be reduced, at the same time improving the reliability of operation.

Indeed, the advantages of reducing the need for cabling and wiring have been considered to be so important that in some applications employing system components requiring an electrical power supply, in addition to the primary function of data transfer, a secondary function of providing electrical power through the data bus has been implemented too. This is the case with the AS-Interface bus, for example.

For actuators, such as valve sets, with relatively high power consumption, the "black power cable" next to the "yellow cable" of the AS-Interface bus provides a 24V floating DC supply which is fully isolated from the data signals. The "black power cable" in an AS-Interface bus is typically rated up to 8 A though the cable itself could handle more. With an improved design, currents higher than 8 A can be drawn, still complying with the AS-Interface specification regarding the amount of voltage drops in the network.

Unfortunately, part of the advantages gained by the reduced need for cabling or wiring are lost if a separate power cable is needed.

SUMMARY

At least one embodiment of the invention improves devices and methods for providing electrical energy to an actuator so that a separate power cabling becomes redundant.

If a device for providing electrical energy to an actuator includes i) a connection device for receiving a first electric current from a data bus, the first electric current having a first voltage, ii) transformer device for converting said first electric current to a second electric current having a second voltage that is relatively higher than the first voltage, iii) a storing device adapted to store electrical energy of said second electric current; and iv) discharging device adapted to discharge electrical energy stored in said storing means to an actuator, the separate power cabling so far required to operate an actuator requiring an operating voltage higher than that available via a data bus is no more needed.

If the device for providing electrical energy to an actuator further comprises a control device adapted to discharge the discharging device, the moment at which the actuator is used can be better selected. In this manner, also actuators requiring more instantaneous power than the data bus can instantaneously supply can be used, since the smaller continuously available power that can be taken from the data bus can be stored.

A particularly efficient way to store electrical energy is to store it in capacitive storing device.

If the connection unit includes an AS-Interface connector, the device for providing electrical energy to an actuator can be adapted to receive energy from the AS-Interface and also the discharging of the actuator may be carried out in response to a command over the AS-Interface.

BRIEF DESCRIPTION OF THE DRAWINGS

The FIGURE shows a device 50 for providing electrical energy to an actuator 200.

DETAILED DESCRIPTION OF THE EXAMPLE EMBODIMENTS

In the following, an example embodiment of the invention is described in more detail with reference to the accompanying drawing in the FIGURE.

The FIGURE shows a device 50 for providing electrical energy to an actuator 200. The device comprises a connection unit 51, a transformer unit 52, a storage unit 53 and a discharging unit 54. Even though it is possible that the device 50 comprises an actuator 200, it is nevertheless not necessary. It suffices that the device 50 is connectable to an actuator 200, preferably via an actuator connector.

The actuator 200 may be any kind of actuator. In the example embodiment, it nevertheless includes a step motor, a magnet valve, an interlocking or interlocking-releasing electromagnet, or a piezoelectric force transducer.

The connection unit 51 is adapted to receive a first electric current from a data bus 100, the first electric current thus having a first voltage UBUS which may be less or equal to the data bus voltage. The connection unit 51 may be carried out using a connector connected to a cable, or with a separate wiring. It provides the first electric current to the transformer unit 52, likewise it provides the ground potential GND for the other units.

A non-limiting example of a data bus 100 suitable for carrying out the invention is the AS-Interface (ASI), in which case the connection unit 51 comprises an AS-Interface connector. The data bus of an AS-Interface includes two wires 101, 102, one of which is the ground line 102 and the other of which is the data line 101, between of which the voltage $U_{BUS}$=30 Volt.

The transformer unit 52 is adapted to convert the first electric current to a second electric current having a second voltage $U_C$ that is relatively higher than the first voltage $U_{BUS}$.

If the direction of the first electric current changes, i.e. that the first electric current is an A.C. current and not an D.C. current, the transformer unit 52 preferably consists of a transformer 52B including a primary coil 321 and a secondary coil 323 and preferably also a ferritic core 322, and optionally also an A.C. to D.C. converter 52C, depending on the kind of the storage unit 53, i.e. depending on whether the storage unit 53 is adapted to store electrical energy of an A.C. current or of a D.C. current. The A.C. to D.C. converter 52C converts, preferably by using four diodes 331, 332, 333 and 334 an A.C. current to a D.C. current and ensures that electrical energy that will be released from the storage unit 53 will not be led back to other parts of the transformer unit 50 and to the data bus 100.

If the direction of the first electric current does not change, i.e. that the first electric current is a D.C. current and not an A.C. current, the transformer unit 52 may additionally comprise a D.C. to A.C. converter 52A between the connection unit 51 and the transformer 52B. A possible circuit for an D.C.

to A.C. converter 52A includes two switches—such as transistors 304, 314—that can be switched in a predetermined manner—preferably with the help of timing components 301, 302, 303, 311, 312, 313—to form an A.C. current, for example, by feeding the a D.C. voltage different ends of the primary coil 321 of the transformer 52C.

Since suitable D.C. to A.C. converters are available on the market at the time of filing of the patent application, it is to be understood that the manner in which the skilled person can carry out the invention does not require an in-depth knowledge of the working principle of an D.C. to A.C. converter.

In the AS-Interface, the voltage between the lines 101, 102 is a D.C. voltage and therefore the first electrical current is a D.C. current.

The storage unit 53 is adapted to store electrical energy of the second electric current. The storage unit 53 is preferably a capacitive storing unit which is extremely well suitable for storing electrical energy contained in a D.C. current. A capacitive storing unit may include one or more capacitors 53 that are connected in series or in parallel.

Also other kinds of systems for storing electrical energy can be used in the storage unit 53, depending whether storage of electrical energy contained in an A.C or in a D.C. current is desired. As a particular example, at least one rechargeable battery where energy is stored chemically, can be used as the storing unit 53 as well.

The discharging unit 54 is adapted to discharge electrical energy stored in the storage unit 53 to an actuator 200. The discharging unit 54 may comprise a switch 343, such as a transistor or a thyristor, a resistor 341 and a diode 340. Upon receiving a discharge command, e.g. in the form of a control voltage TRG, the switch is activated and electrical energy stored in the storage unit 53 is released to the actuator 200.

The circuitry of the device 50 is preferably connected to both the data line 101 and the ground line 102. The data line 101 is preferably connected to a control unit 110 that is adapted to discharge the discharging unit 54 preferably by setting a control voltage TRG. The control unit 110 may be adapted to discharge the discharging unit 54 in response to a command (DATA) received via the data bus 100, or upon meeting predefined criteria, such as passing of enough current to the transformer unit 52 indicating that the charge status of the energy storing unit 53 is enough to actuate the actuator 200.

To this end, the control unit 110 may include a protocol stack adapted to communicate over the AS-Interface, i.e. to receive or send 4-bits of user data or as in the "Combined Transaction Type 1", to receive or send 16-bit analog values.

Even though the invention was described using a non-limiting embodiment, the true scope of the invention can be studied from the scope of the attached patent claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A device for providing electrical energy to an actuator, comprising:
    connection unit to receive a first electric current from a data bus, the first electric current having a first voltage; and
    transformer unit to convert said first electric current to a second electric current having a second voltage that is relatively higher than said first voltage;
    storing unit to store electrical energy of said second electric current; and
    discharging unit to discharge electrical energy stored in said storing unit to an actuator.

2. A device according to claim 1, further comprising control unit to discharge said discharging unit.

3. A device according to claim 2, wherein said control unit is responsive to a command received from the data bus.

4. A device according to claim 3, wherein said control unit comprises a protocol stack adapted to communicate over the AS-Interface.

5. A device according to claim 1, wherein the storing unit is a capacitive storing unit.

6. A device according to claim 1, wherein said connection unit comprises an AS-Interface connector.

7. An actuator system, comprising:
    an actuator; and
    a device as claimed in claim 1, for providing electrical energy to said actuator.

8. An actuator system according to claim 7, wherein said actuator comprises at least one of a step motor, a magnet valve, an interlocking or interlocking-releasing electromagnet, and a piezoelectric force transducer.

9. A method for providing electrical energy to an actuator, comprising:
    receiving an electric current having a first voltage from a data bus;
    converting the electric current to a current having a second voltage that is relatively higher than the first voltage;
    storing electrical energy of the second electric current; and
    discharging said stored electrical energy to an actuator.

10. A method according to claim 9, wherein said storing of electrical energy is performed using a capacitive storing device.

11. A device for providing electrical energy to an actuator, comprising:
    means for receiving an electric current having a first voltage from a data bus;
    means for converting the electric current to a current having a second voltage that is relatively higher than the first voltage;
    means for storing electrical energy of the second electric current; and
    means for discharging said stored electrical energy to an actuator.

12. A device according to claim 11, further comprising control means for discharging said means for discharging.

13. A device according to claim 12, wherein said control means is responsive to a command received from the data bus.

14. A device according to claim 13, wherein said control means comprises a protocol stack adapted to communicate over the AS-Interface.

15. A device according to claim 11, wherein the storing means includes a capacitive storing device.

16. A device according to claim 11, wherein said connection means comprises an AS-Interface connector.

17. An actuator system, comprising:
    an actuator; and
    a device as claimed in claim 11, for providing electrical energy to said actuator.

18. An actuator system according to claim 17, wherein said actuator comprises at least one of a step motor, a magnet valve, an interlocking or interlocking-releasing electromagnet, and a piezoelectric force transducer.

* * * * *